Jan 6, 1931.   C. A. JOHNSON   1,787,986
SHAFT LUBRICATION
Filed April 3, 1928

INVENTOR:
CARL A. JOHNSON,
BY HIS ATTORNEY

Patented Jan. 6, 1931

1,787,986

UNITED STATES PATENT OFFICE

CARL A. JOHNSON, OF EVANSTON, ILLINOIS, ASSIGNOR TO GENERAL MOTORS CORPORATION, OF DETROIT, MICHIGAN, A CORPORATION OF DELAWARE

SHAFT LUBRICATION

Application filed April 3, 1928. Serial No. 266,898.

This invention relates to shaft lubrication and comprises all the features of novelty herein disclosed in connection with a railway journal box and axle. An object of the invention is to provide improved means for causing the delivery of adequate lubricant to shaft bearings and for causing a constant circulation. Another object is to provide an improved thrust block and lubricating means therefor. Another object is to provide an improved force feed lubricating device actuated by the shaft to be lubricated. To these ends and to improve generally and in detail upon devices of the character indicated, the invention also consists in the various matters hereinafter described and claimed.

Figure 1:
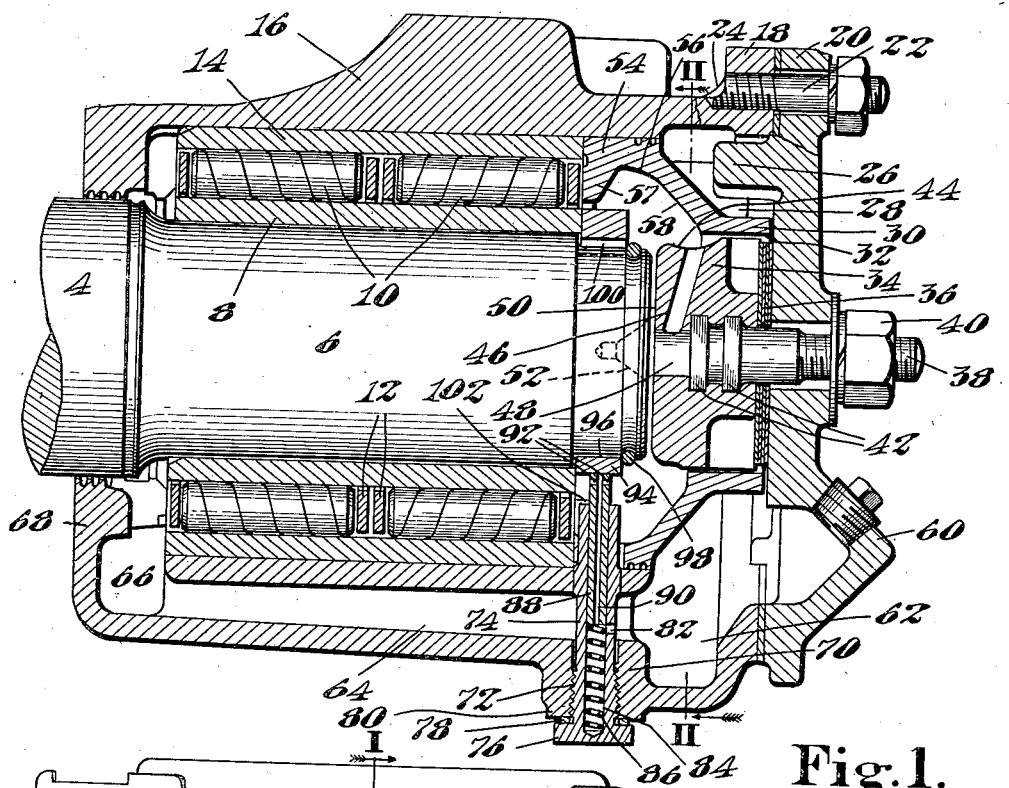
Figure 2:
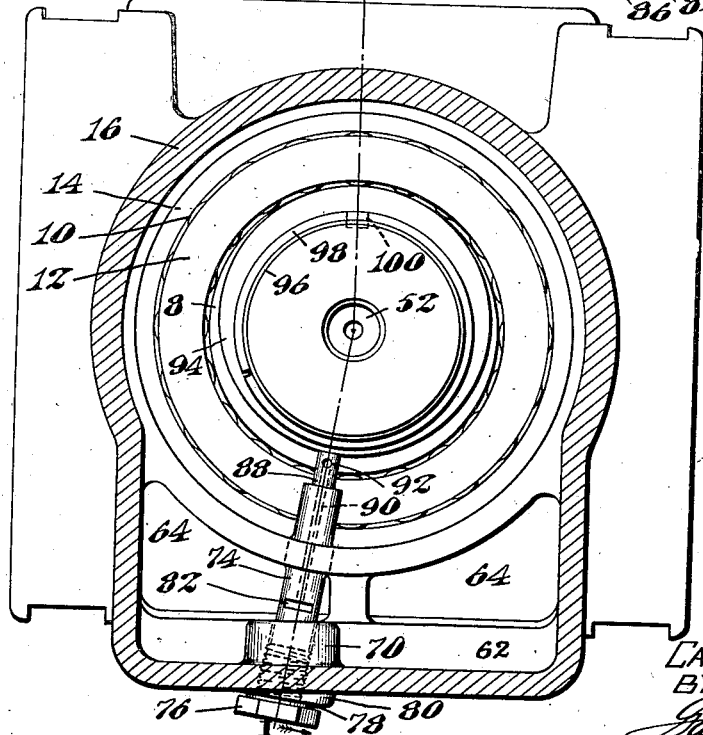

The invention, in its broader aspects, is not necessarily limited to the specific construction selected for illustrative purposes in the accompanying drawings in which Fig. 1 is a longitudinal section of an axle box on line I—I of Fig. 2.

Fig. 2 is a transverse section on line II—II of Fig. 1 with the thrust block and retaining ring removed.

The numeral 4 indicates a shaft or axle having a reduced cylindrical portion 6 receiving a sleeve 8, roller bearings 10 having end rings 12 being interposed between the sleeve and a lining 14 pressed into the bore of an axle box or casing 16. The end of the box or casing has an out-turned flange 18 to which and end cap 20 is attached by nuts and threaded studs 22, the studs being threaded in the flange 18 and welded thereto as indicated at 24. The end cap has a lug 26 extending inwardly between spaced lugs 28 on the outside of a retaining ring 30 to hold the ring from turning. The ring has a square opening 32 for the square portion of a bronze thrust block 34 and spacing plates 36, the block and plates being clamped against the end cap by a stud 38 and nut 40. The stud has square collars 42 around which the thrust block is cast to hold the stud from turning. The thurst block has a rounded recess or groove 44 at the top side from which an unobstructed internal duct or passage 46 leads to a central opening or passage 48 in the block. The block has an annular thrust face 50 spaced slightly from a cooperating thrust face on the end of the axle outside of the conical lathe center opening 52.

The retaining ring 30 has a cylindrical enlargement 54 provided with grease grooves making a close joint with the bore of the box or casing. The ring also has an internal annular groove 56 formed by a flange 57 and a conical surface 58 extending round about the opposing faces of the shaft and the thrust block. The conical surface slopes downwardly towards the thrust block and directs some of the oil thro vn off centrifugally by the axle to the recess or groove 44 which is of larger area than the passage 46 to collect oil from a larger area of the conical surface and drain it into the passages 46 and 48 to lubricate the end of the axle when the latter shifts endwise to meet the thrust surface 50. Oil is admitted through a hollow boss 60 in the end cap to a reservoir 62 in the box, the reservoir being partitioned off from the end of the axle and its bearings and from the thrust block by the retaining ring. The level of oil is high enough to enter the cored out return passages 64, a recess 66 at the inner or rear end of the axle box inside the flange 68 receiving used oil from the bearings. The oil is lifted to the bearings and to the thrust faces as will now appear.

The box has a boss 70 just to one side of its longitudinal center with a threaded opening 72 receiving the threaded portion of a hollow bolt or housing 74, the hexagonal head 76 of the bolt engaging a washer 78 interposed between it and a boss 80 on the outside of the box. The hollow bolt or housing has a side port 82 arranged to admit oil from the reservoir to its bore 84 which also contains a coil spring 86. The spring tends to lift a slidable hollow plunger 88 to a position where the lower end of the plunger uncovers the port 82. The plunger has a central bore or passage 90 with radial branch ports 92 near the upper end, the upper end of the plunger bearing against the outer eccentric surface of a sleeve or cam 94 which fits a reduced cylindrical portion 96 of the axle. The eccentric sleeve is held on the axle by a split ring 98 and is held from rotation by a key 100. The plunger is indicated in its uppermost position but as the axle rotates, the eccentric sleeve 94 forces the plunger down to close the port 82 and force the trapped oil up the central bore. The oil spurting out from the radial ports 92 drains through a notch 102 in the flange 57 into the bearings and works inwardly through the bearings to the recess 66, thus having a constant circulation. Oil in the central bore 90 lubricates the contact of the plunger with the eccentric sleeve and supplies oil to the sleeve, the oil being thrown off centrifugally from the sleeve and some working down the conical surface 57 to the thrust block as above explained and the rest draining to the bearings.

I claim:

1. In a device of the character described, a casing, a shaft journalled for rotation in the casing, the casing carrying a thrust block at the end of the shaft and having a reservoir, means for partitioning off the end of the shaft and the thrust block from the reservoir, and a pump actuated by the rotation of the shaft for forcing lubricant from the reservoir through the partitioning means to the shaft, the partitioning means having inclined surfaces for directing lubricant, thrown off from the shaft, to both the journal bearing and the thrust block; substantially as described.

2. In a device of the character described, a casing, a shaft journalled for rotation in the casing, the casing having a reservoir, a thrust block carried by the casing and having a thrust face with an unobstructed passage leading therefrom to the top portion of the block, means for partitioning off the end of the shaft and its bearing from the reservoir, a cam member on the shaft, a pump actuated by the cam member for forcing lubricant from the reservoir through the partitioning means to the cam member, the partitioning means having steep conical surfaces to direct lubricant, thrown off by the cam member, to both the journal bearing and the passage in the thrust block; substantially as described.

3. In a device of the character described, a casing, a shaft journalled for rotation in the casing, a thrust block carried by the casing, the block having a central opening and a thrust face outside the opening to oppose the end of the shaft, the block having an unobstructed internal duct leading from the central opening to its upper side, the upper side of the block having a recess of larger area than the duct and draining into it, and means for directing lubricant to the recess; substantially as described.

4. In a device of the character described, a casing, a shaft journalled for rotation in the casing, a thrust block carried by the casing and opposing the end of the shaft, the block having unobstructed internal lubricant passages leading from its top portion to its thrust face, and a ring surrounding the thrust block and having a steep conical surface for directing lubricant, thrown from the shaft, to the open end of the passage at the top portion of the block; substantially as described.

5. In a device of the character described, a casing, a shaft journalled for rotation in the casing, a thrust block carried by the casing and opposing the end of the shaft, the block having unobstructed internal lubricant passages leading from its top portion to its thrust face, the casing having a lubricant reservoir, an eccentric near the end of the shaft, a ring surrounding the eccentric and the opposing faces of the thrust block and the shaft and having a steep conical surface for directing lubricant, thrown from the eccentric, to the top portion of the block, and means for forcing lubricant from the reservoir to the eccentric; substantially as described.

6. In a device of the character described, a casing having a reservoir, a shaft journalled for rotation in the casing, a thrust block carried by the casing and having a thrust face opposed to the end of the shaft, a cam member on the shaft, a pump actuated by the cam member for forcing lubricant from the reservoir to the cam member, and a casing member having a surface extending about the opposing faces of the block and the shaft and sloping downwardly towards the block for directing lubricant thrown off by the cam member to the thrust block; substantially as described.

7. In a device of the character described, a casing having a reservoir, a shaft journalled for rotation in the casing, a thrust block carried by the casing and having a thrust face opposed to the end of the shaft, a pump actuated by the rotation of the shaft for forcing lubricant from the reservoir to the shaft, and a casing member having a surface extending about the opposing faces of the block and the shaft and sloping downwardly towards the block for directing lubricant thrown off by the shaft to the thrust block; substantially as described.

In testimony whereof I hereunto affix my signature.

CARL A. JOHNSON.